UNITED STATES PATENT OFFICE.

LÉON GAUMONT, OF PARIS, FRANCE, ASSIGNOR TO SOCIÉTÉ DES ETABLISSEMENTS GAUMONT, OF PARIS, FRANCE.

SCREEN FOR PROJECTING.

1,231,727.  Specification of Letters Patent.  Patented July 3, 1917.

Application filed December 29, 1913. Serial No. 809,405.

*To all whom it may concern:*

Be it known that I, LÉON GAUMONT, a citizen of the Republic of France, residing in Paris, France, have invented certain new and useful Improvements in Screens for Projecting, of which the following is a specification.

This application relates to transparent screens used for projecting.

Linen-cloth, calico and like material have hitherto been used for this purpose, being made transparent by keeping them moist with water, to which a certain proportion of glycerin is usually added, or else by applying a varnish, or a gelatin coating.

The applicant has contrived a screen for projecting by transparency and possessed with a powerful luminous effect by using tulle *i. e.* a fabric in which the opaque part is very small as compared with the spaces or empty part. A thin layer of a translucent material is applied to this tulle, such as a solution of gelatin for instance, in which a pulverulent substance held in suspension, such a baryta, talc and the like is incorporated, in short an emulsion, or the emulsion may be of opalescent material such as starch paste or some other paste, and finally a second coating of varnish may be given to the tulle, so as to impart such a transparency to the whole device that the projected view is withheld or checked, although the device retains its luminosity completely. After drying the translucent surface could also be frosted by means of a sand blast or any other process.

Figure 1:
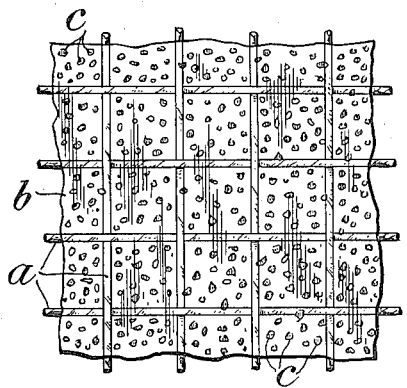
Figure 2:
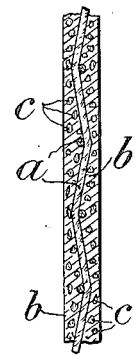

Figure 1 of the accompanying drawings shows a fragment of the screen on a magnified scale, Fig. 2 being a transverse section thereof.

In the drawings, *a a* are the threads, wires, or other filaments constituting the open-mesh fabric, and *b* is the filling of gelatin or other translucent or nearly transparent substance in which is held the non-transparent material which gives the translucent effect to the screen, being here shown as particles *c c* of a pulverulent substance, or which may be taken as cells of starch or the like.

It is obvious that instead of tulle another open fabric or a wire gauze could for instance be used and that the gelatin solution could be replaced by collodion or some other material that is able to form a very thin and very transparent surface on being dried.

The gelatin or other emulsion or cementitious body may be rendered insoluble by means of formol, bichromate of potash, etc.

What I claim is:

1. A translucent screen for projecting, comprising a fabric of filaments, so separated that the opaque area is small compared with the area of the intervening spaces, with a translucent cementitious substance filling its interstices, a hardening agent for such cementitious substance, and a non-transparent material held in and distributed through such cementitious substance.

2. A translucent screen for projecting, comprising a fabric of filaments so separated that the opaque area is small compared with the area of the intervening spaces, with a translucent gelatinous cementitious substance filling its interstices, a hardening agent rendering such gelatinous substance insoluble, and a subdivided non-transparent material held in and distributed through such gelatinous substance.

In witness whereof, I have hereunto signed my name in the presence of two subscribing witnesses.

LÉON GAUMONT.

Witnesses:
HANSON C. COXE,
GABRIEL BELLIARD.